(12) United States Patent
Tadepalli et al.

(10) Patent No.: US 6,275,352 B1
(45) Date of Patent: Aug. 14, 2001

(54) INDIVIDUALLY TUNED ISOLATION DEVICES FOR A DISC DRIVE BASE DECK

(75) Inventors: Srinivas Tadepalli, Oklahoma City; Roy L. Wood, Yukon; John D. Stricklin, Oklahoma City, all of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/348,887

(22) Filed: Jul. 1, 1999

Related U.S. Application Data

(60) Provisional application No. 60/091,557, filed on Jul. 2, 1998.

(51) Int. Cl.[7] .................................................. G11B 33/14
(52) U.S. Cl. ............................................................ 360/97.02
(58) Field of Search .............................. 360/97.01, 97.02; 369/263; 361/683–685

(56) References Cited

U.S. PATENT DOCUMENTS

| 4,947,093 | 8/1990 | Dunstan et al. . |
| 5,140,478 | 8/1992 | Yoshida . |
| 5,400,196 | 3/1995 | Moser et al. . |
| 5,469,311 | 11/1995 | Nishida et al. . |
| 5,777,821 | 7/1998 | Pottebaum . |

OTHER PUBLICATIONS

"A Case for Redundant Arrays of Inexpensive Discs (RAID)" Report No. UCB/CSD 87/391 Dec. 1987 Computer Sciences Division (EECS), University of California, Berkley, California.

Primary Examiner—George J. Letscher
(74) Attorney, Agent, or Firm—Crowe & Dunlevy

(57) ABSTRACT

An apparatus and method for minimizing the effects of rotational and translational vibrations on a disc drive. A plurality of isolation devices are integrated into a base deck of the disc drive at industry standard locations. Each isolation device includes a rigid threaded collar into which a corresponding fastener is inserted to secure the base to a user environment, a compliant elastomer portion disposed between the collar and remaining portions of the base deck and a rigid stiffener which contacts and surrounds at least a portion of an outer surface of the elastomer portion. Stiffnesses of the elastomer portions are individually selected so that the plurality of isolation devices cooperate to reduce the effects of various translational and rotational vibratory inputs by bunching resonance modes within a selected frequency range.

7 Claims, 9 Drawing Sheets

INDIVIDUALLY TUNED ISOLATION DEVICES FOR A DISC DRIVE BASE DECK

RELATED APPLICATIONS

This application claims priority to U.S. Provisional Application No. 60/091,557 entitled SCREW ISOLATION DEVICE, filed Jul. 2, 1998.

FIELD OF THE INVENTION

This invention relates generally to the field of disc drive storage devices, and more particularly, but not by way of limitation, to improving disc drive operational performance using isolation devices with individually selected dampening and stiffness characteristics in a disc drive base deck.

BACKGROUND OF THE INVENTION

Disc drives are digital data storage devices which enable users of computer systems to store and retrieve large amounts of data in a fast and efficient manner. Disc drives of the present generation have data storage capacities in excess of several gigabytes (GB) and can transfer data at sustained rates of several megabytes (MB) per second.

A typical disc drive is provided with a plurality of magnetic recording discs which are mounted to a rotatable hub of a spindle motor for rotation at a constant, high speed. An array of read/write heads are disposed adjacent surfaces of the discs to transfer data between the discs and a host computer. The heads are radially positioned over the discs by a closed loop, digital servo system, and are caused to fly proximate the surfaces of the discs upon air bearings established by air flow set up by the high speed rotation of the discs.

A plurality of nominally concentric tracks are defined on each disc surface, with disc drives of the present generation having track densities in excess of 7,000 tracks per centimeter (18,000 tracks per inch). A preamp and driver circuit generates write currents that are used by the head to selectively magnetize the tracks during a data write operation and amplifies read signals detected by the head during a data read operation. A read/write channel and interface circuit are operably connected to the preamp and driver circuit to transfer the data between the discs and the host computer.

A rigid housing is provided to support the spindle motor and the actuator and to form an internal controlled environment to minimize particulate contamination of the discs and heads. A printed wiring assembly (PWA) is mounted to the exterior of the housing to accommodate the disc drive control electronics (including the aforementioned servo circuit, read/write channel and interface circuit).

Disc drives are often used in a stand-alone fashion, such as in a typical personal computer (PC) configuration where a single disc drive is utilized as the primary data storage peripheral device. However, in applications requiring vast amounts of data storage capacity or high input/output (I/O) bandwidth, a plurality of drives can be arranged into a multi-drive array, sometimes referred to as a RAID ("Redundant Array of Inexpensive Discs"; also "Redundant Array of Independent Discs"). A seminal article proposing various RAID architectures was published in 1987 by Patterson et al., entitled "A Case for Redundant Arrays of Inexpensive Discs (RAID)", Report No. UCB/CSD 87/391, December 1987, Computer Science Division (EECS), University of California, Berkeley, Calif.

Since their introduction, RAIDs have found widespread use in a variety of applications requiring significant data transfer and storage capacities. It is presently common to incorporate several tens, if not hundreds, of drives into a single RAID. While advantageously facilitating generation of large scale data storage systems, however, the coupling of multiple drives within the same enclosure can also set up undesirable vibrations from excitation sources within the drives, such as spindle motors used to rotate the discs and actuators used to move the heads to various tracks on the discs. Such vibrations can be transmitted from drive to drive through chassis mounts used to secure the drives within the enclosure.

Vibrational components can be characterized as translational, or rotational. Translational vibrations tend to move a disc drive housing back and forth along a plane of the drive, whereas rotational vibrations tend to rotate a disc drive housing about an axis normal to a plane of the drive. Translational vibrations will generally have a smaller effect upon the ability of the actuator to maintain the heads at a selected position with respect to the discs, as the discs and the actuator will both respond to the movement induced by such translational vibrations. Particularly, disc drive designers typically attempt to provide balanced actuators to minimize actuator rotation during a translational vibration event.

However, such is not true with rotational vibrations. Even with a nominally balanced actuator, rotational vibrations will tend to move the discs relative to the actuator because the actuator, acting as a free body, remains essentially undisturbed due to inertial effects while the discs, mounted to the housing, are displaced by imparted rotational vibration. When sufficiently severe, such movement will cause an "off-track" condition whereby a head is moved away from a selected track being followed. Such off-track conditions can adversely affect the ability of the drive to transfer data between the discs and host device.

Known methods of reduction of the negative effects associated with disc drive mechanical resonances have generally followed the pattern of attempting to make all components sufficiently stiff so that their resonant frequencies are made as high as possible. Although this appears to be a sensible procedure, it often suffers from the problem that, although the resonance frequency is increased, the mechanical "gain" or "Q" at resonance also increases, thus tending to reduce the bandwidth improvement that might otherwise be expected. Reducing the gain by, for example, change in geometry or use of composite materials can become difficult or expensive.

One prior art isolation technique has included use of shock mounts that support and isolate the disc drive from externally applied mechanical shocks, such as exemplified by U.S. Pat. No. 4,947,093 issued to Dunstan et al. and U.S. Pat. No. 5,469,311 issued to Nishida et al. Such an approach generally utilizes a number of externally disposed shock mounts, or shock absorbers, between the disc drive housing and the user environment. Because shock mounts are bulky and add to the effective size of the disc drive assembly, disc drive manufacturers have for the most part migrated away from the use of such devices.

Another prior art isolation technique involves the use of a chassis system, such as discussed in U.S. Pat. No. 5,140, 478 issued to Yoshida and U.S. Pat. No. 5,777,821 issued Jul. 7, 1998 to Pottebaum. Such an approach involves the mounting of a chassis to exterior portions of the disc drive housing with an elastomeric damping material disposed therebetween. While reducing space requirements, the use of a chassis requires manufacturing and fitting of an additional component to the disc drive assembly, and can add weight and cost to the final product. Moreover, chassis systems also can have a significantly large force path which does not allow the dampening material to react quickly and effectively. In practice, shock mounts and chassis systems have been found operable, but not without attendant difficulties and limitations in vibratory isolation characteristics.

The feature of a low vibration disc drive assembly is especially desirable in disc drives subject to portable applications. Portability itself has its own requirements and objectives. In the computer world, specific designs for portability began in the early 1980's with personal computers weighing as much as around 14 kilograms, kg (30 pounds, lbs). These devices were supplied with substantial carrying handles and were more accurately described as "luggage" by users. This style of portable computer has since evolved into multiple generation "laptop" machines with substantially reduced weights and dimensions.

In parallel with these size-reduction trends in the computer world, the rigid disc drive industry has witnessed its own dramatic minimization over the last 40 years, from initial disc diameters of about 710 centimeters, cm (28 inches) in the 1960's to diameters today ranging from about 84 cm (3.3 inches) down to less than 25 cm (less than one inch).

These trends in disc drive form factors have been matched by complimentary improvements in data storage densities, performance, power requirements, and price. The increasing sophistication, availability, and universality of popular software during the last few years has also fueled the requirement for versatile, high-performance personal computers and has driven the hardware developments in the industry. Taking all of those trends together, the growing demand for laptop computers requires a matching availability of small, lightweight, high performance hard disc drives with the storage capability equivalent to that obtained on drives designed for desktop computers.

Accordingly, as disc drive track densities and performance requirements continue to increase and the disc drive assemblies get smaller, there remains a continual need for improved approaches in the art to isolate disc drives from externally generated rotational and translational vibrations and mechanical shocks. It is to such improvements that this invention is directed.

SUMMARY OF THE INVENTION

The present invention provides an apparatus and method for isolating a disc drive base deck from externally generated vibrations and mechanical shocks.

As exemplified by presently preferred embodiments, a disc drive includes a base deck supporting a rotatable disc and a rotary actuator which supports a head adjacent the disc. This base deck has opposing interior and exterior surfaces and comprises a plurality of isolation devices configured to receive fasteners to secure the base deck in a user environment at industry standard mounting locations. For disc drives having what is referred to in the industry as a "three and one-half inch form factor," four isolation devices preferably extend from the bottom of the disc drive and six isolation devices preferably extend from sides of the disc drive.

Each isolation device includes a rigid threaded collar into which a fastener can be inserted to attach the base deck to the user environment, a compliant elastomer to isolate the collar from remaining portions of the base deck, and a rigid stiffener that surrounds at least a portion of the elastomer. An aperture is formed between the stiffener and remaining portions of the base deck so that the stiffener does not come into contact therewith.

Recesses are preferably provided in the exterior surface of the base deck to accommodate the isolation devices so that no additional height is added to the disc drive thereby. The elastomer portions are attached to the base deck using a suitable adhesive.

Preferably, the elastomer portion of each isolation device is provided with an individually selected stiffness, which will in most cases vary from the stiffnesses of the other elastomer portions. This enables the isolation devices to cooperate to reduce the effects of externally supplied vibrations and mechanical shocks upon the disc drive in a variety of translational and rotational modes.

These and various other features as well as advantages which characterize the present invention will be apparent from a reading of the following detailed description and a review of the associated drawings.

DETAILED DESCRIPTION

Figure 1:
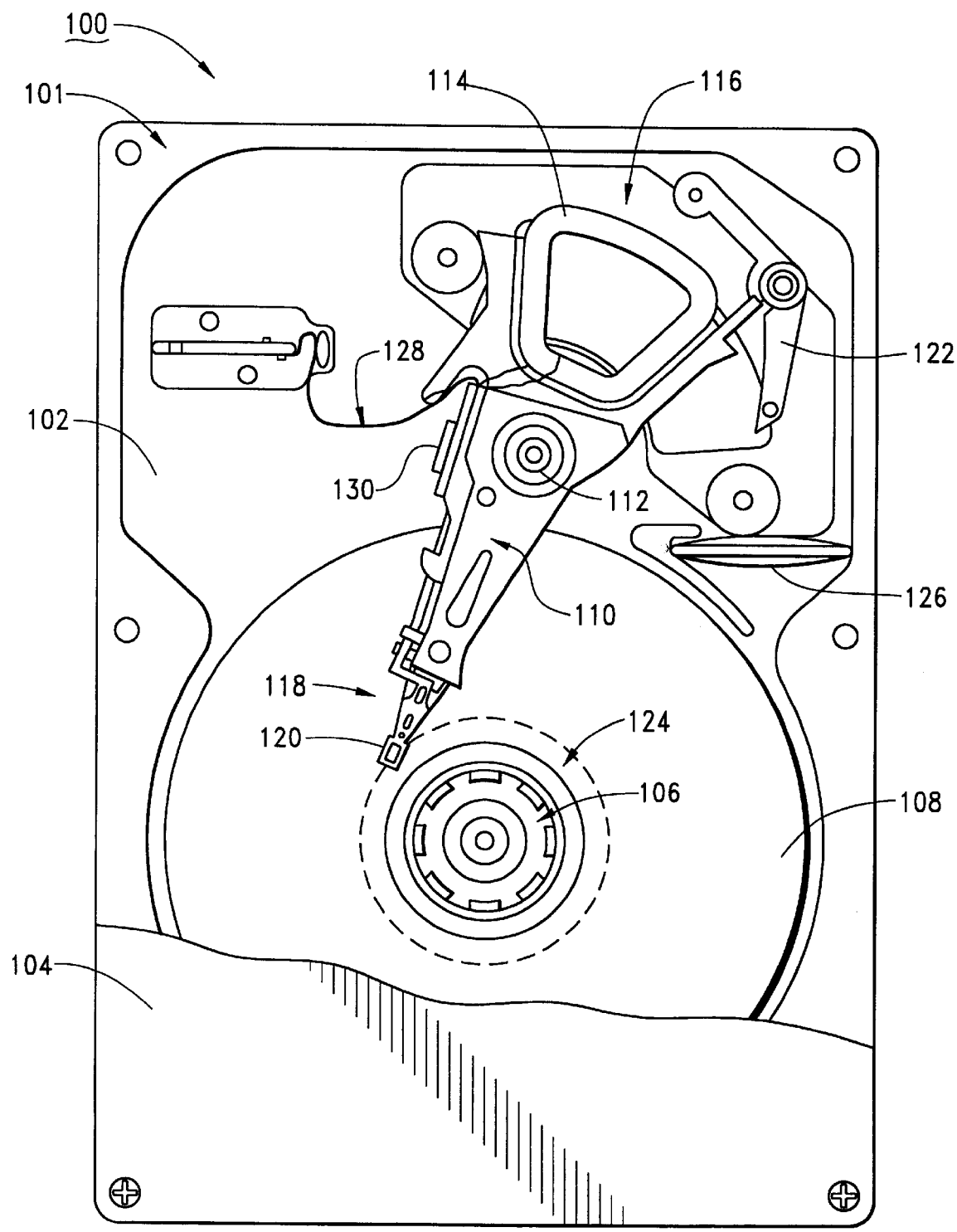
FIG. 1 provides a top plan view of a disc drive constructed in accordance with preferred embodiments of the present invention.

In order to set forth a detailed description of various preferred embodiments of the present invention, reference is first made to FIG. 1 which shows a top plan view of a disc drive 100 used to store computer data. The disc drive 100 is formed of two primary assemblies: a head/disc assembly (HDA) 101 which composes substantially of all the mechanical portions of the disc drive, and a printed wiring assembly (PWA) which supports electronics used to control the operation of the HDA. The PWA is mounted to the underside of the HDA 101 and is thus not visible in FIG. 1.

The HDA 101 includes a base deck 102 to which various disc drive components are mounted. A top cover 104, shown in partial cutaway fashion, cooperates with the base deck 102 to form a sealed housing for the HDA 101. A spindle motor 106 is provided to rotate a plurality of discs 108 at a constant high speed during normal disc drive operation. For reference, each of the discs 108 has a nominal diameter of 84 millimeters (3.3 inches), and the disc drive 100 has external dimensions which conform to what is commonly referred to in the industry as a "three and one-half inch" form factor.

To access the discs 108, a controllably positionable actuator assembly 110 (also referred to as an "e-block") is provided which rotates via a cartridge bearing assembly 112 in response to currents applied to a coil 114 of a voice coil motor (VCM, a portion of which is shown at 116). A plurality of flexible suspension assemblies 118 extend to support a corresponding plurality of read/write head assemblies 120 over the discs 108. The head assemblies 120 are positionably located over data tracks (not shown) of the discs 108 in order to read data from and write data to the tracks, respectively.

An inertial latch assembly 122 latches the actuator assembly 110 when the disc drive 100 is deactivated so that the head assemblies 108 are brought to rest upon texturized landing zones 124 near the innermost diameters of the discs 108. A recirculation air filter 126 filters out airborne particulate contamination as air is channeled from the rotating discs 108 to cool the actuator coil 114.

A flex circuit assembly 128 facilitates electrical communication between the actuator assembly 110 and the disc drive PWA. The flex circuit assembly 128 includes a preamplifier/driver circuit 130 which applies read bias and write currents to the head assemblies 120.

Figure 2:
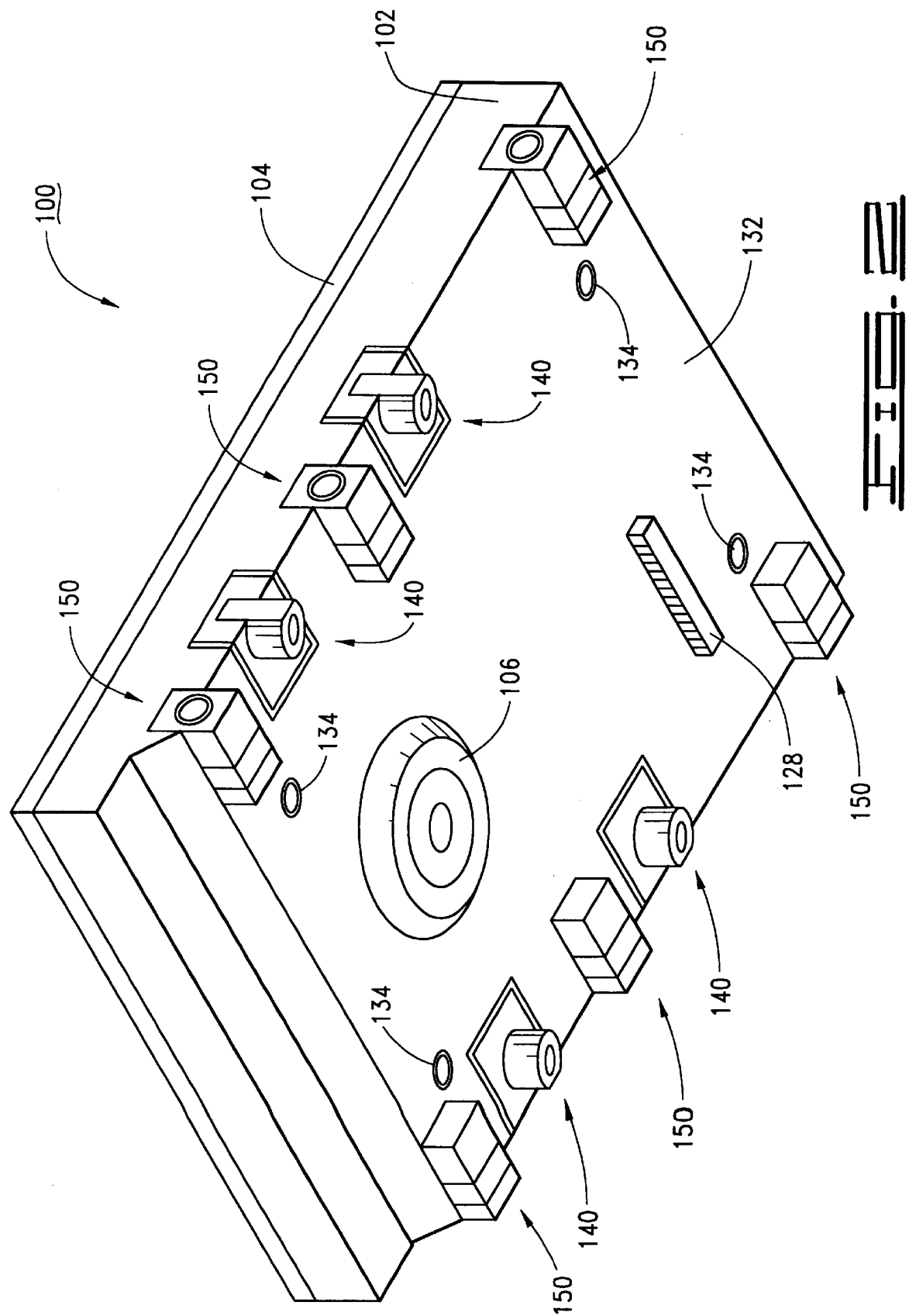
FIG. 2 provides an isometric view of a bottom, exterior surface of the base deck of the disc drive of FIG. 1, illustrating a plurality of bottom and side isolation devices constructed in accordance with the present invention.

Referring now to FIG. 2, shown therein is an isometric view of the disc drive 100, illustrating bottom portions of the base deck 102, including an exterior planar surface 132 to which the aforementioned disc drive PWA is mounted via threaded mounting apertures 134 (the PWA has been omitted from FIG. 2 to reveal selected features of interest).

The base deck 102 is shown to include a number of isolation devices constructed in accordance with preferred embodiments of the present invention. More particularly, a total of four bottom isolation devices (denoted generally at 140) and six side isolation devices (denoted generally at 150) provide threaded mounting apertures at industry standard locations to accommodate fasteners to secure the disc drive 100 in a user environment.

Preferred constructions and operational characteristics of the isolation devices 140, 150 will be discussed below, but at this point it will be noted that the isolation devices serve to isolate the disc drive 100 from externally generated vibrations from the user environment. Particularly, each of the isolation devices 140, 150 preferably has an individually selected stiffness that varies from the stiffnesses of remaining isolation devices to improve vibratory isolation and damping characteristics of the disc drive 100.

The isolation devices 140, 150 are preferably affixed within corresponding recesses (not numerically designated) in the base deck 102, as shown, allowing the disc drive 100 to maintain industry standard form factor dimensions; that is, the isolation devices 140, 150 shown in FIG. 2 do not add additional height or width to the disc drive 100, which is desirable as space is often at a premium.

Figure 3:
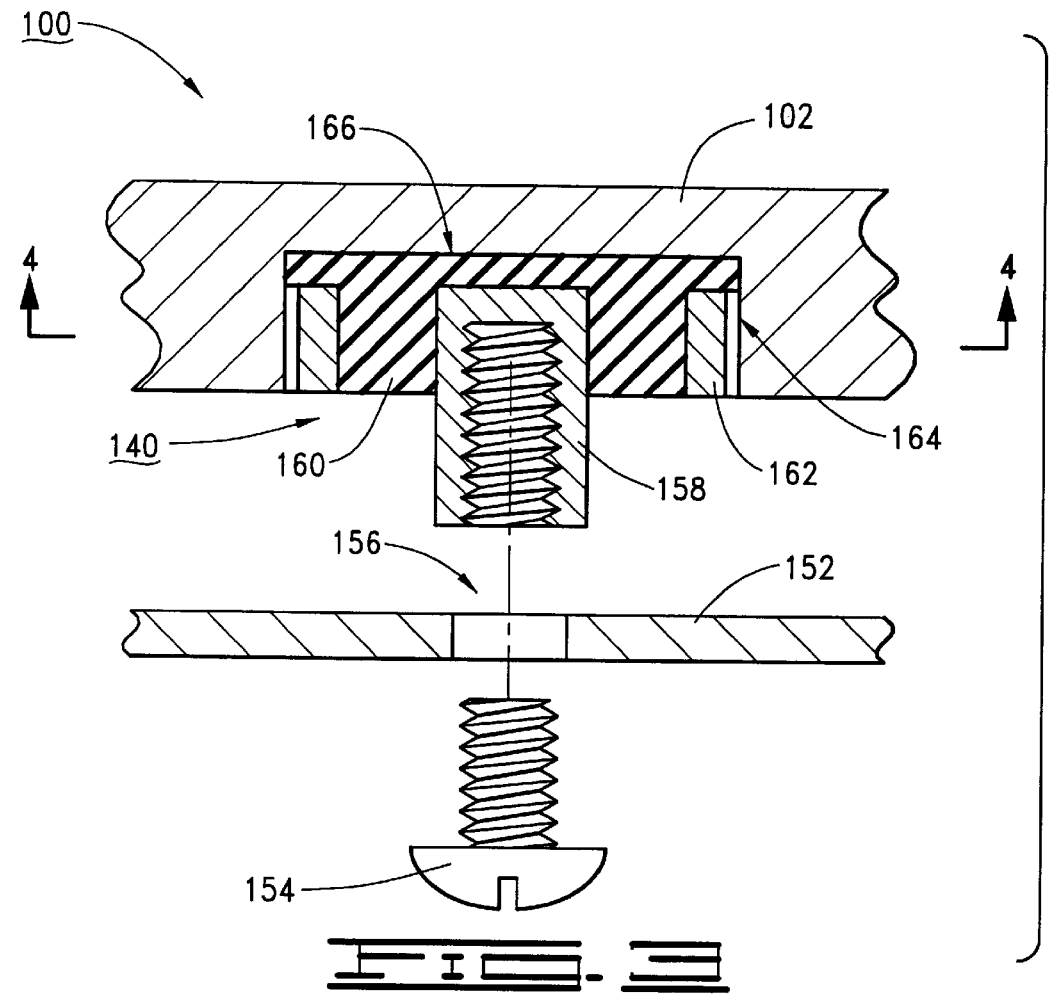
FIG. 3 shows a cross-sectional, elevational view of a selected one of the bottom isolation devices of FIG. 2.
Figure 4:
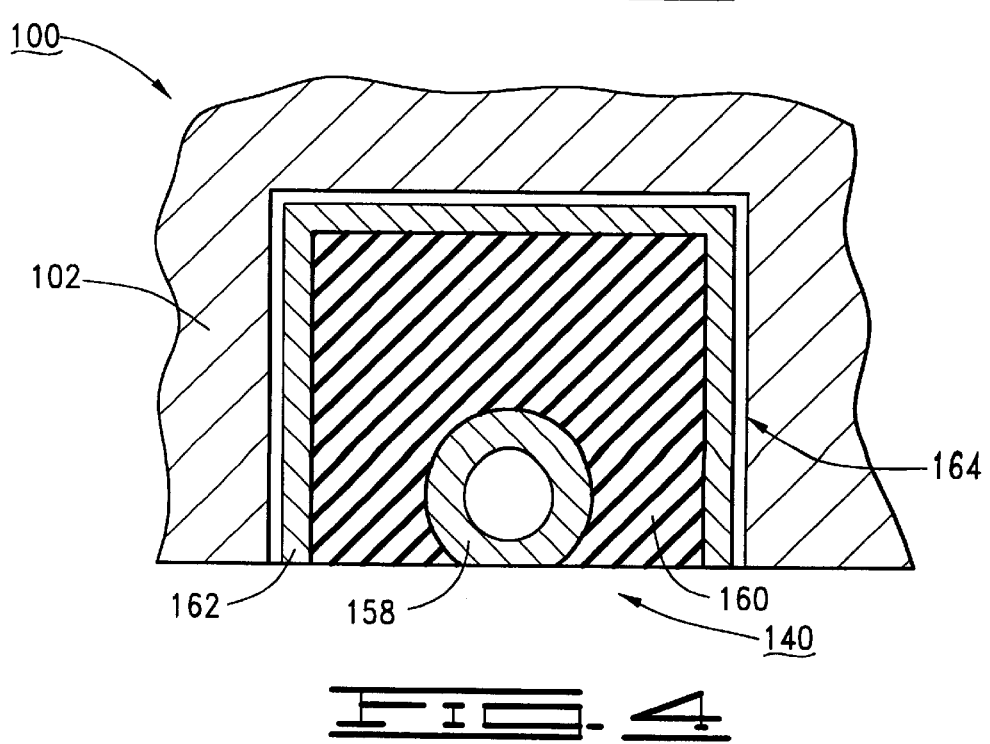
FIG. 4 provides a cross-sectional, plan view of the bottom isolation device of FIG. 3, as viewed along line 4—4 in FIG. 3.

A first preferred construction of the bottom isolation devices 140 is shown in FIGS. 3 and 4. More particularly, FIG. 3 provides a cross-sectional, elevational view of a selected one of the bottom isolation devices 140, in conjunction with a portion of a rigid deck 152 of the user environment to which the disc drive 100 can be mounted by way of a threaded fastener 154. For reference, the deck 152 can constitute a portion of a bay in a personal computer with a pass-through mounting aperture 156 to accommodate the fastener 154. Additional hardware, such as washers, can be utilized as desired, but have been omitted for clarity.

The isolation device 140 comprises a rigid, threaded collar 158, a compliant elastomer 160 and a rigid stiffener 162. The collar 158 threadingly receives the fastener 154 as shown. The elastomer 160 contactingly supports the collar 158 and is disposed between the collar 158 and remaining portions of the base deck 102. The stiffener 162 in turn contactingly supports the elastomer 160 about at least a portion of an outer surface (not designated) of the elastomer 160 to retain the desired shape of the elastomer 160. The aforementioned recess in the base deck to accommodate the isolation device 140 is identified in FIG. 3 at 164, and it will be noted that the isolation device 140 and the recess 164 are respectively sized to form an aperture therebetween so that the stiffener 162 does not come into contact with the base deck 102.

The isolation device 140 is affixed within the recess 164 by bonding a mounting surface 166 of the elastomer 160 to the base deck 102 using a suitable adhesive. In this way, the collar 158, which is rigidly affixed to the deck 152, is isolated from remaining portions of the base deck 102 by the elastomer 160. The elastomer 160 is formed from a suitable material, such as vulcanized rubber. The collar 158 and stiffener 162 are preferably formed of metal, such as aluminum or stainless steel. The particular configuration and material construction of these elements are preferably selected as discussed below.

FIG. 4 shows a cross-sectional view of the isolation device 140 of FIG. 3, as viewed along line 4—4 in FIG. 3. The collar 158, although generally cylindrical in shape, is shown in FIG. 4 to preferably include a flat surface 168 which lies along a plane defined by remaining elements in FIG. 4.

Figure 5:
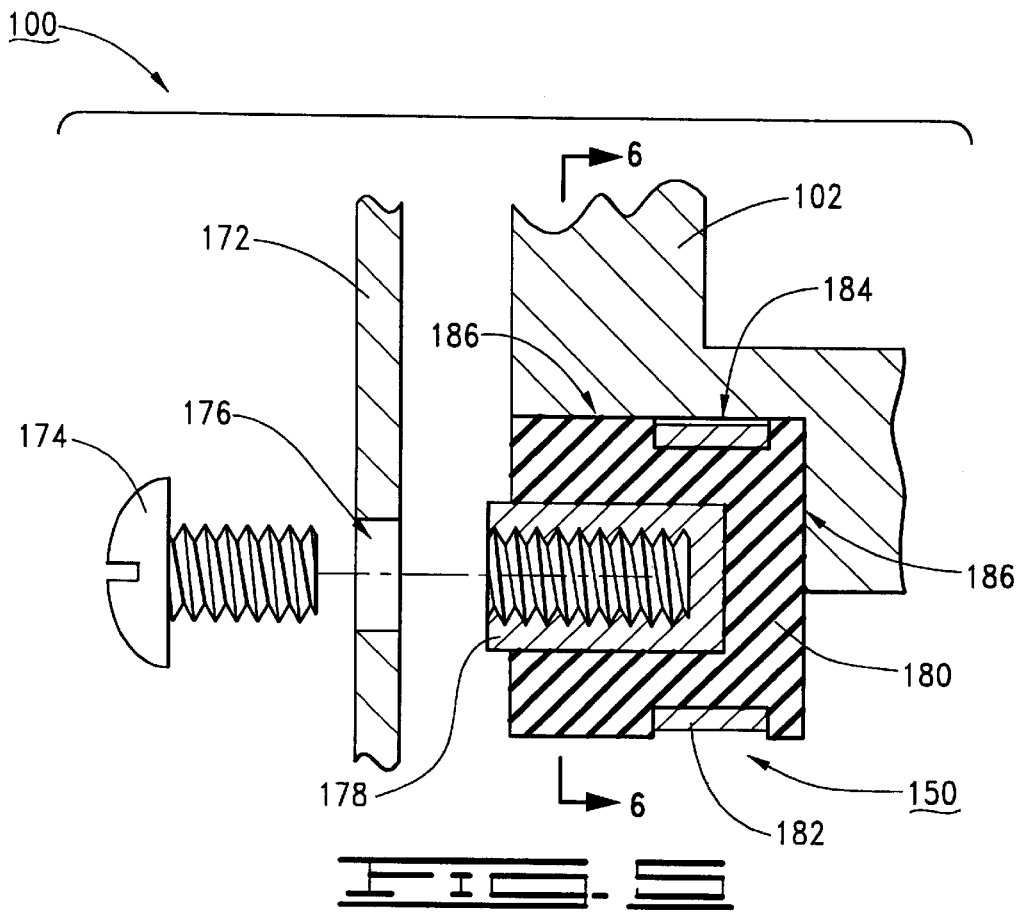
FIG. 5 shows a cross-sectional, elevational view of a selected one of the side isolation devices of FIG. 2.

Referring now to FIG. 5, shown therein is a cross-sectional, elevational view of a selected one of the side isolation devices 150 of FIG. 2, in accordance with a first preferred construction. As with the bottom isolation device 140 of FIG. 3, the side isolation device 150 of FIG. 5 is shown in conjunction with a portion of a rigid deck 172 of the user environment, to which the disc drive 100 can be mounted using threaded fastener 174 by inserting the threaded fastener 174 through a mounting aperture 176 in the deck 172.

Figure 6:
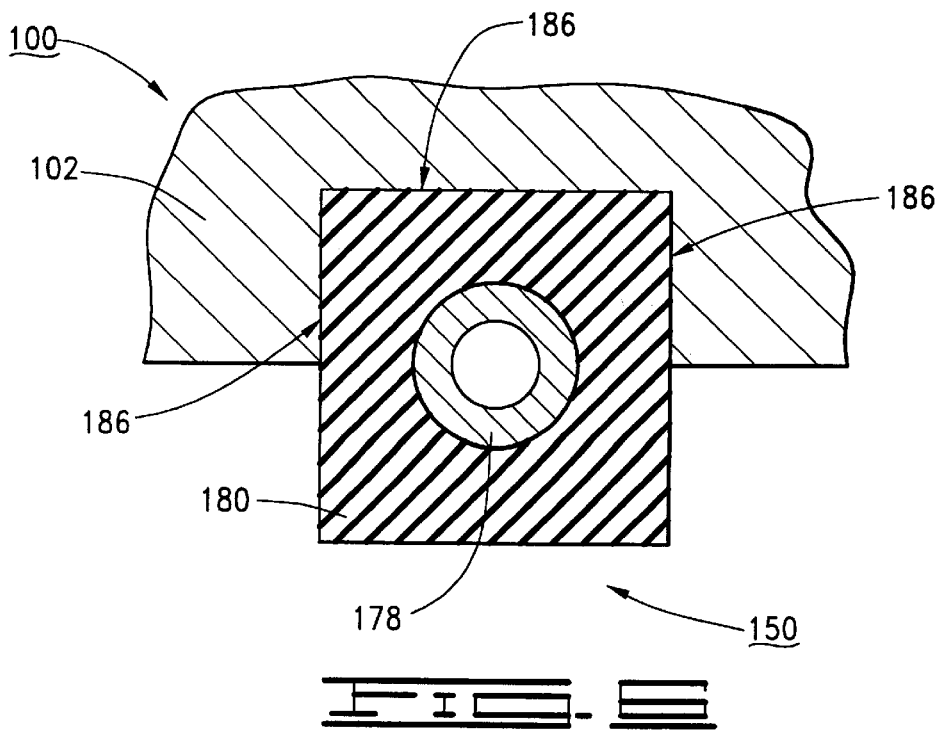
FIG. 6 provides a cross-sectional, plan view of the side isolation device of FIG. 5, as viewed along line 6—6 in FIG. 5.

The construction of the side isolation device 150 of FIG. 5 is generally similar to the bottom isolation device 140 of FIGS. 3 and 4, in that the side isolation device 150 of FIG. 5 includes a rigid threaded collar 178, a compliant elastomer 180 and a rigid stiffener 182, which generally cooperate as described above. A recess 184 is provided in the base deck 102 to accommodate the isolation device 150, with mounting surfaces (denoted at 186) of the elastomer 180 bonded to the base deck 102 using a suitable adhesive. As before, the isolation device 150 is preferably configured to prevent contact between the stiffener 182 and remaining portions of the base deck 102. FIG. 6 provides a cross-sectional view of the isolation device 150 of FIG. 5, as viewed along line 6—6 in FIG. 5.

An important advantage of the isolation devices 140, 150 over the prior art is that the stiffness of each isolation device can be individually tuned to improve isolation of the disc drive 100 from the user environment. Prior art isolation techniques typically employ shock mounts that are all fabricated from a material with a predetermined stiffness, regardless of the distance of each shock mount from the center of gravity of the disc drive and from each of the other shock mounts. As is known in the art, a disc drive exposed to external vibrations will normally experience a wide range of frequencies in the x, y, and z directions. Using one material stiffness for a plurality of isolation devices can be found largely ineffective in dampening the resulting wide range of frequencies since each device is located a different distance from the other devices and the center of gravity of the disk drive. In particular, without tuning each device individually, it has been found that good rotational shock isolation can not always be readily achieved.

Thus, the isolation devices of FIG. 2 are individually tuned so that improved isolation and vibration characteristics are achieved. In particular, the stiffnesses of the isolation devices 140 are selected to dampen a wide range of frequencies and concentrate or "bunch" the resonant vibrations into a narrow range below a predetermined frequency that optimizes servo performance (this is referred to as "modal bunching"). Thus, the disc drive 100 is isolated above a predetermined frequency, such as 400 Hz.

Figure 7:
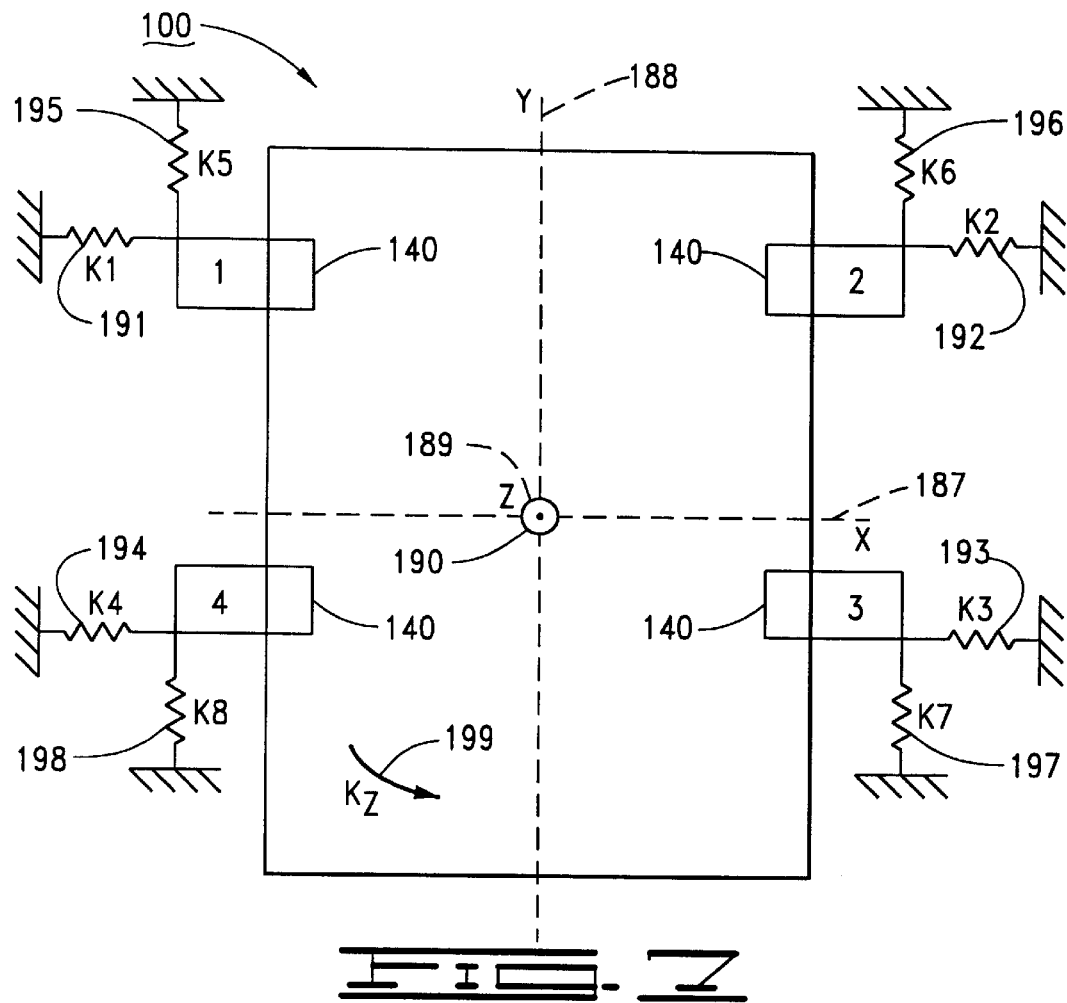
FIG. 7 shows a schematic representation of the disc drive of FIG. 1 oriented along x, y and z axes.

To discuss a preferred approach to achieving this desired end, FIG. 7 has been provided to show spring stiffnesses that enable various directional forces that can be applied to the disc drive through the isolation devices 140. The disc drive 100 has been schematically set forth in FIG. 7 along x, y and z orthogonal axes 187, 188 and 189. The center of gravity for the disc drive 100 has been denoted at point 190, which from a review of FIG. 1 will be recognized as being near the cartridge bearing assembly 112 about which the actuator 110 pivots. It should be noted that these figures are not drawn to scale so, for example, the location of the center of gravity will vary depending on the specific disk drive design and is not meant to approximate its actual location in any one drive.

FIG. 7 provides various x and y aligned springs K1–K8 (with corresponding reference numerals 191–198) to represent the respective stiffnesses of the four bottom isolation devices 140, identified in FIG. 7 as 1–4. Preferably, as discussed below, the stiffnesses are chosen to reduce sensitivity of the disc drive 100 to various directional vibratory inputs above a selected frequency, such as 400 hertz (Hz).

Thus, in the present example the stiffnesses of the four bottom isolation devices 140 have been selected to reduce sensitivity to translational vibrations in a direction parallel to the x-axis 187, translational vibrations in a direction parallel to the y-axis 188, and rotational vibrations about an axis parallel to the z axis 190 (such as denoted by Kz moment 199).

Figure 8:
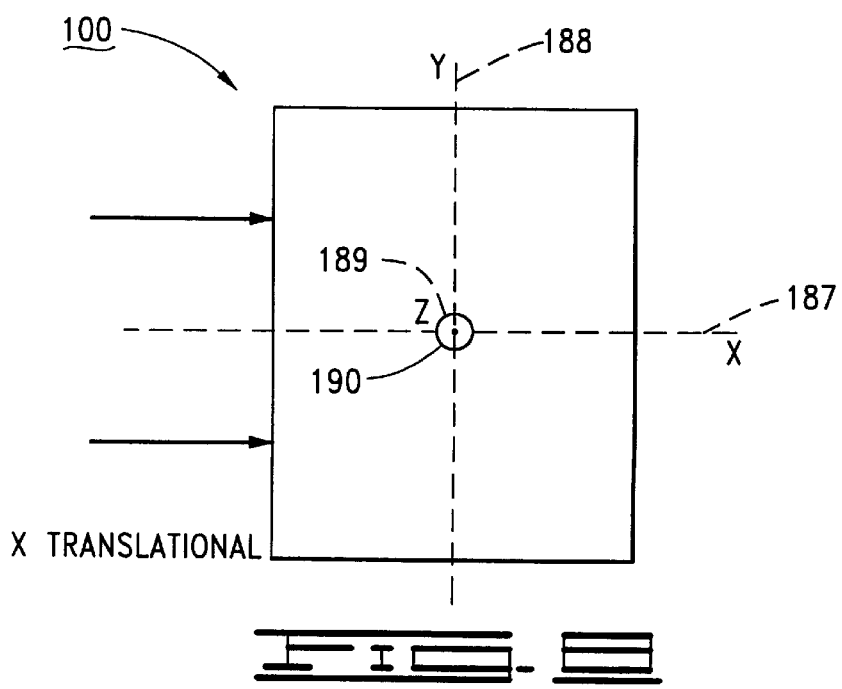
FIG. 8 provides a representation of translational vibrations applied to the disc drive in the x-direction.
Figure 9:
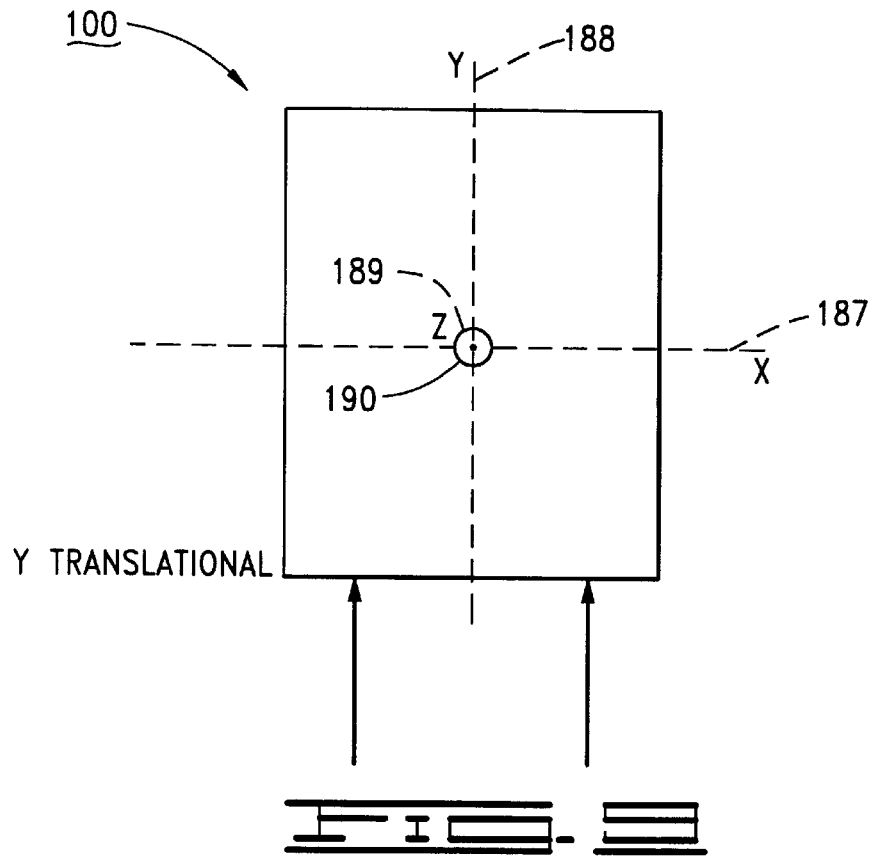
FIG. 9 provides a representation of translational vibrations applied to the disc drive in the y-direction.
Figure 10:
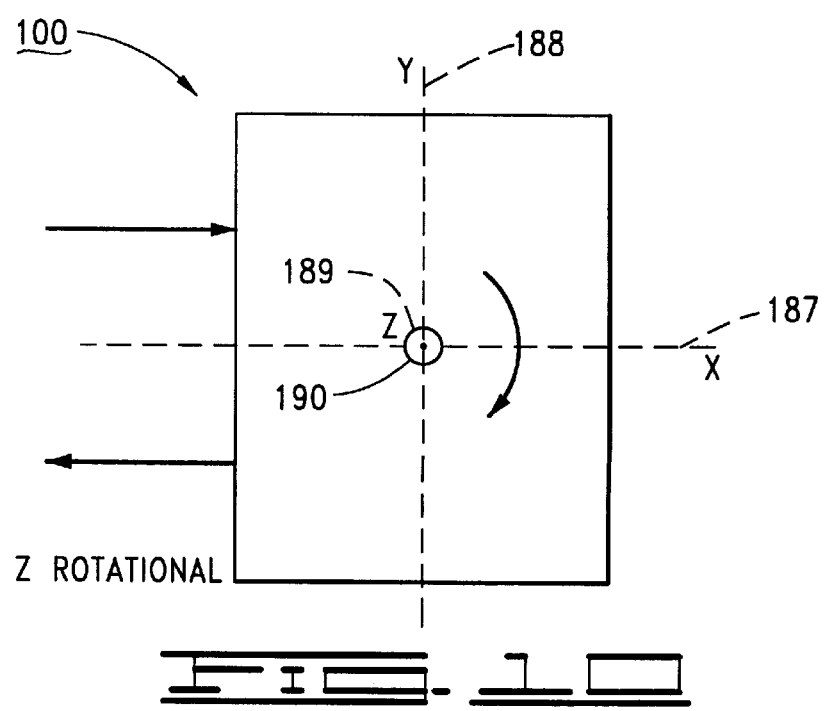
FIG. 10 provides a representation of rotational vibrations applied to the disc drive in the xy plane, causing the disc drive to rotate about an axis parallel to the z axis.

Particularly, FIGS. 8 and 9 illustrate translational forces applied to the disc drive 100 in the x and y directions, respectively. It will be recognized that translational forces generally tend to move all parts of the disc drive in the same direction (such as in a generally back and forth motion). By contrast, FIG. 10 provides an illustration of rotational forces applied to the disc drive 100, which tend to turn the disc drive about an axis parallel to the z-axis 190.

Returning to FIG. 7, the respective x and y directed stiffnesses of the four bottom isolation devices 140, as represented by springs 191–198, are preferably set as shown in Table I for the present example.

TABLE I

| Direction | Isolation Device | Spring Force | Stiffness |
|---|---|---|---|
| x-axis | 1 | K1 (191) | 340 kg/cm (1900 lbs/in) |
| x-axis | 2 | K2 (192) | 680 kg/cm (3800 lbs/in) |
| x-axis | 3 | K3 (193) | 143 kg/cm (800 lbs/in) |
| x-axis | 4 | K4 (194) | 143 kg/cm (800 lbs/in) |
| y-axis | 1 | K5 (195) | 340 kg/cm (1900 lbs/in) |
| y-axis | 2 | K6 (196) | 680 kg/cm (3800 lbs/in) |
| y-axis | 3 | K7 (197) | 143 kg/cm (800 lbs/in) |
| y-axis | 4 | K8 (198) | 143 kg/cm (800 lbs/in) |

From the values in Table I, the individual configurations of the stiffeners 140, including shape, dimensions and material, can be readily selected by those skilled in the art to achieve the desired characteristics. The configuration set forth by Table I has an axial stiffness value of 268 kg/cm (1500 lbs/in) in the z direction 189. Of course, the values in Table I have been provided merely to present a particular example; other values would likely be obtained using different design constraints.

The stiffnesses described in Table I effectively dampen the externally induced vibrations exerted on the disk drive 100 so that the disk drive will experience vibrations at frequencies in the x direction 187 of 235 Hz, in the y direction 188 of 237 Hz, and in the z direction 189 of 240 Hz. Those skilled in the art will recognize that the roll-off in the transmissibility can be achieved more advantageously by modal bunching. Therefore, in the present invention, maximum resonance by the disc drive 100 occurs in a narrow range as a result of bunching the frequencies in all three modes or directions around 240 Hz since a disk drive servo unit can handle frequencies below 400 Hz more effectively, the bunching of frequencies around 240 Hz, as provided in the present invention, provides the disk drive with an effectively wider operating frequency band-width.

Figure 11:
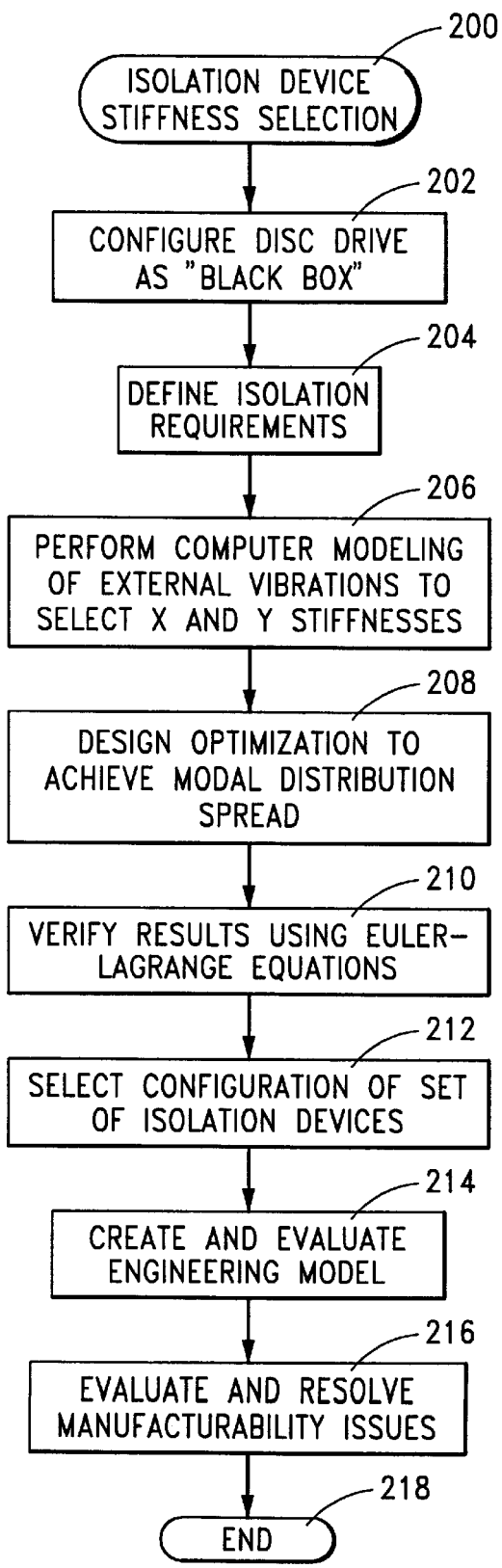
FIG. 11 is a flow chart for a ISOLATION DEVICE STIFFNESS SELECTION routine, generally illustrative of steps carried out in accordance with preferred embodiments to individually select the stiffness characteristics of a selected set of isolation devices.

FIG. 11 provides a flow chart for a ISOLATION DEVICE STIFFNESS SELECTION routine 200, generally illustrative of steps carried out in accordance with preferred embodiments to individually select the stiffness characteristics of a selected set of isolation devices. For the foregoing example, this selected set of isolation devices comprises the four bottom isolation devices 140 shown in FIGS. 2 and 7, although other sets of isolation devices are readily contemplated, such as the six side isolation devices 150 of FIG. 2.

To simplify the analysis, it has been found advantageous to separate externally supplied vibrations, generated by excitation sources outside the disc drive 100 (from the user environment) from internally generated vibrations generated by the disc drive 100 (such as by the spindle motor 106 and the actuator 110), thereby treating the disc drive 100 as a "black box." This operation is represented by step 202 in the flow of FIG. 11.

Next, as shown at step 204 the isolation requirements for the particular drive configuration are defined. For instance, in the above example isolation from external vibrations was required above 400 Hz. At this step, the directional inputs are also selected (e.g., x and y translational as well as z rotational).

Computer modeling is performed for the disc drive 100, as set forth by step 206, in order to derive desired levels of x and y directional stiffnesses for each isolation device based on known factors, such as mounting locations and location of the center of gravity, after which the stiffnesses are optimized to achieve a narrow modal distribution spread, step 208. Commercially available software, such as offered by Ansys, Inc., of Canonsburg, Pa., U.S.A. can be advantageously utilized.

Once this analysis is completed, the results are independently verified using analytical modeling techniques (Euler-Lagrange equations) to minimize the energy of the system, as shown at step 210. The results of steps 208 and 210 are compared and, if sufficient agreement is found, resulting stiffness, location and designs are selected, step 212. To more fully illustrate the analytical steps taken to optimize the design of the isolation devices, the governing equations are shown below. The following equations govern the kinetic and potential energies of the system when there are small deflections:

$$T = \frac{1}{2} M(\dot{q}_1^2 + \dot{q}_2^2) + \frac{1}{2} I_{zz} \dot{q}_3^2 \quad \text{and} \quad (1)$$

$$V = \frac{1}{2} k_{x1}(q_1 + bq_3)^2 + \frac{1}{2} k_{x2}(q_1 - dq_3)^2 + \frac{1}{2} k_{y1}(q_2 - aq_3)^2 + \frac{1}{2} k_{y2}(q_2 - aq_3)^2 + \frac{1}{2} k_{x4}(q_1 + bq_3)^2 + \frac{1}{2} k_{x3}(q_1 - dq_3)^2 + \frac{1}{2} k_{y4}(q_2 + cq_3)^2 + \frac{1}{2} k_{y3}(q_2 + cq_3)^2 \quad (2)$$

where,

T=Total kinetic energy;
V=Total potential energy;
$L_x$=Disk drive length in x direction;
$L_y$=Disk drive length in y direction;
a=Distance from the center of gravity to x-axis between two isolation devices;
b=Distance from the center of gravity to y-axis between two isolation devices;
c=$L_x$−a;
d=$L_y$−b;
M=mass of the drive;
$q_1$, $q_2$=displacements in the x and y directions;
$q_3$=rotation along the z axis around the center of gravity;
$\dot{q}_i$=rate of change of $q_i$;
$k_{xi}, k_{yi}$=stiffness of the isolators in the x and y directions, i=1,2,3,4; and
$I_{zz}$=Moment of inertia in the z axis passing through the center of gravity.

Solving the Euler-Lagrange equations yields a cubic, the solution of which gives three vibrational modes; the x-translation, the y-translation, and the z-rotational for the disk drive with four bottom isolation devices. These modes are compared with the Finite element Ansys model to confirm good agreement. To increase bandwidth, these modes are therefore optimized and bunched together using the Ansys structural simulation software as denoted in step 208.

An engineering model mockup is next fabricated and tested, step 214, using the results selected by step 212, and the performance of the engineering model is compared to the predicted performance of steps 208 and 210. If engineering feasibility is determined, manufacturing issues are evaluated to determine whether the design is suitable for incorporation into a large volume manufacturing process, step 216. If so, the isolation devices are utilized in production disc drives; if not, the process is repeated with new criteria. The flow then ends at 218.

Figure 12:
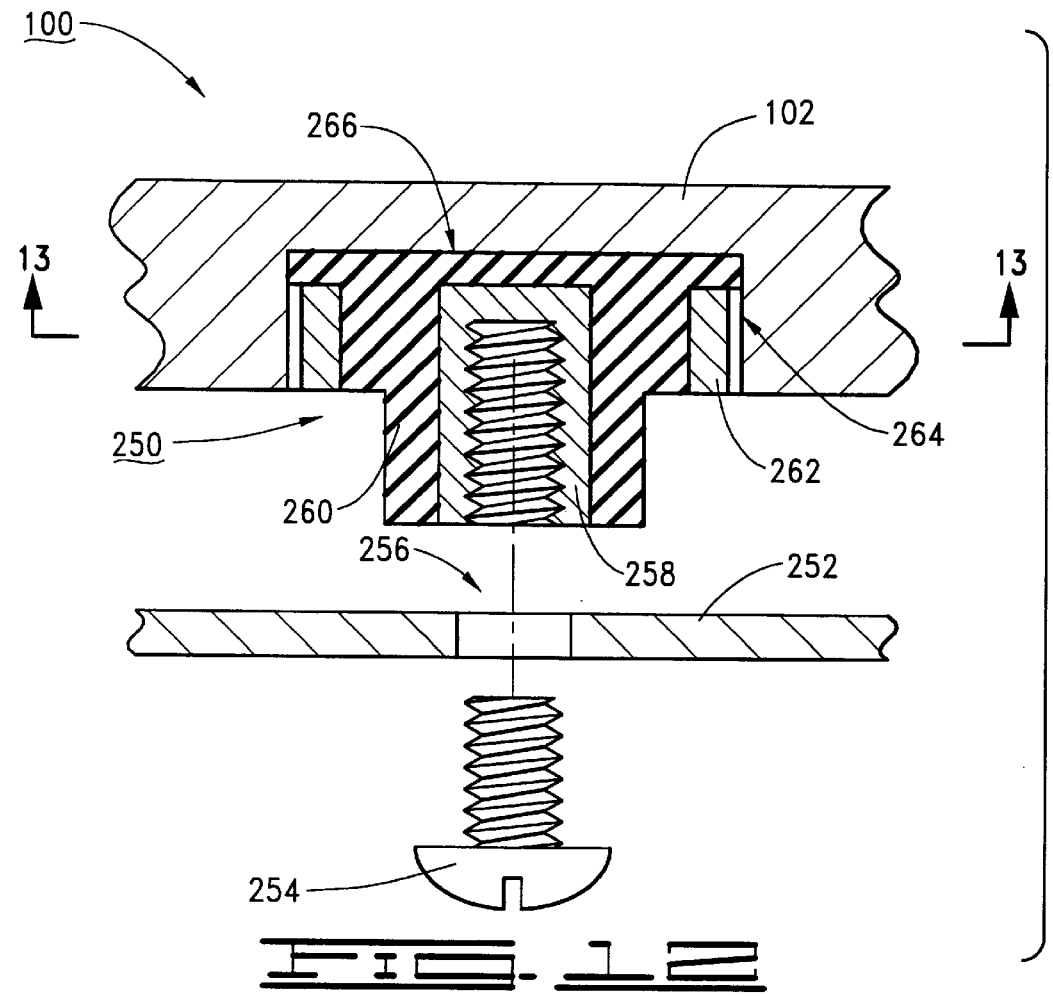
FIG. 12 shows a cross-sectional, elevational view of an alternative bottom isolation device.

Referring now to FIG. 12, shown therein is a cross-sectional, elevational view of a bottom isolation device 250, in accordance with an alternative preferred embodiment of the present invention. As with the bottom isolation device 140 of FIG. 3, the alternative isolation device 250 of FIG. 12 is shown in conjunction with a portion of a rigid deck 252 of the user environment, to which the disc drive 100 can be mounted using a threaded fastener 254 by inserting the threaded fastener 254 through a mounting aperture 256 in the deck 252.

The construction of the alternative isolation device of FIG. 12 is generally similar to the isolation device 140 of FIGS. 3 and 4, in that the isolation device 250 includes a rigid threaded collar 258, a compliant elastomer 260 and a rigid stiffener 262, which generally cooperate as described above. It will be noted, however, that the elastomer 260 surrounds and extends along an entire length of the collar 258.

Figure 13:
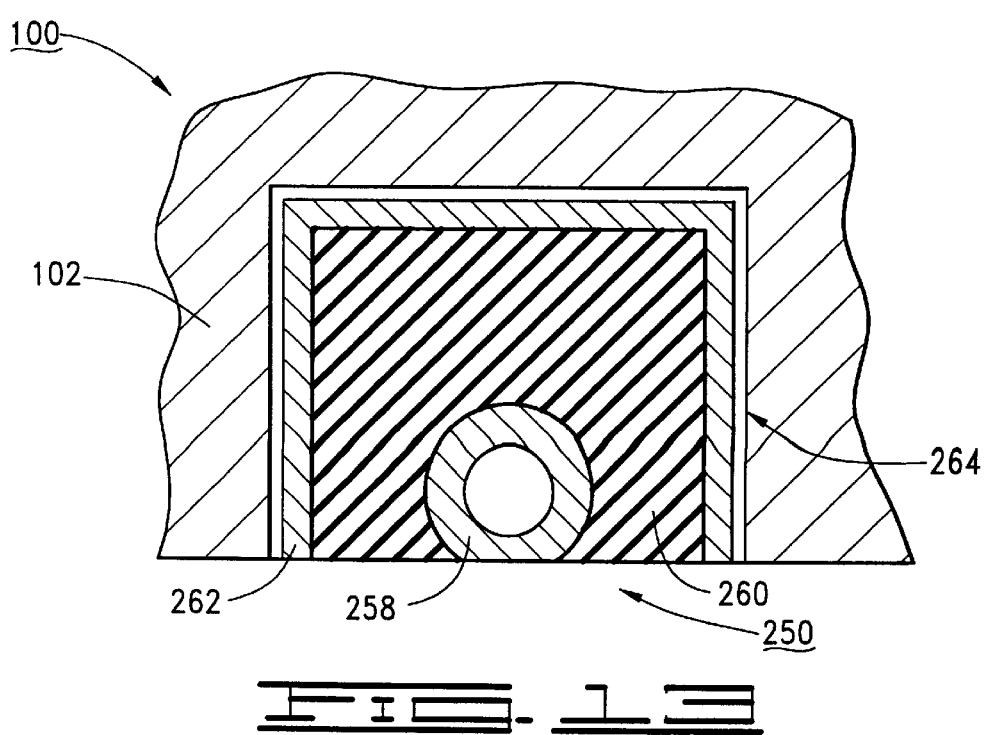
FIG. 13 provides a cross-sectional, plan view of the bottom isolation device of FIG. 12, as viewed along line 13—13 in FIG. 12.

A recess 264 is provided in the base deck 102 to accommodate the isolation device, with mounting surfaces (denoted at 266) of the elastomer 260 bonded to the base deck 102 using a suitable adhesive. As before, the isolation device is preferably configured to prevent contact between the stiffener 262 and remaining portions of the base deck 102. FIG. 13 provides a cross-sectional view of the isolation device of FIG. 12, as viewed along line 13—13 in FIG. 12.

Figure 14:
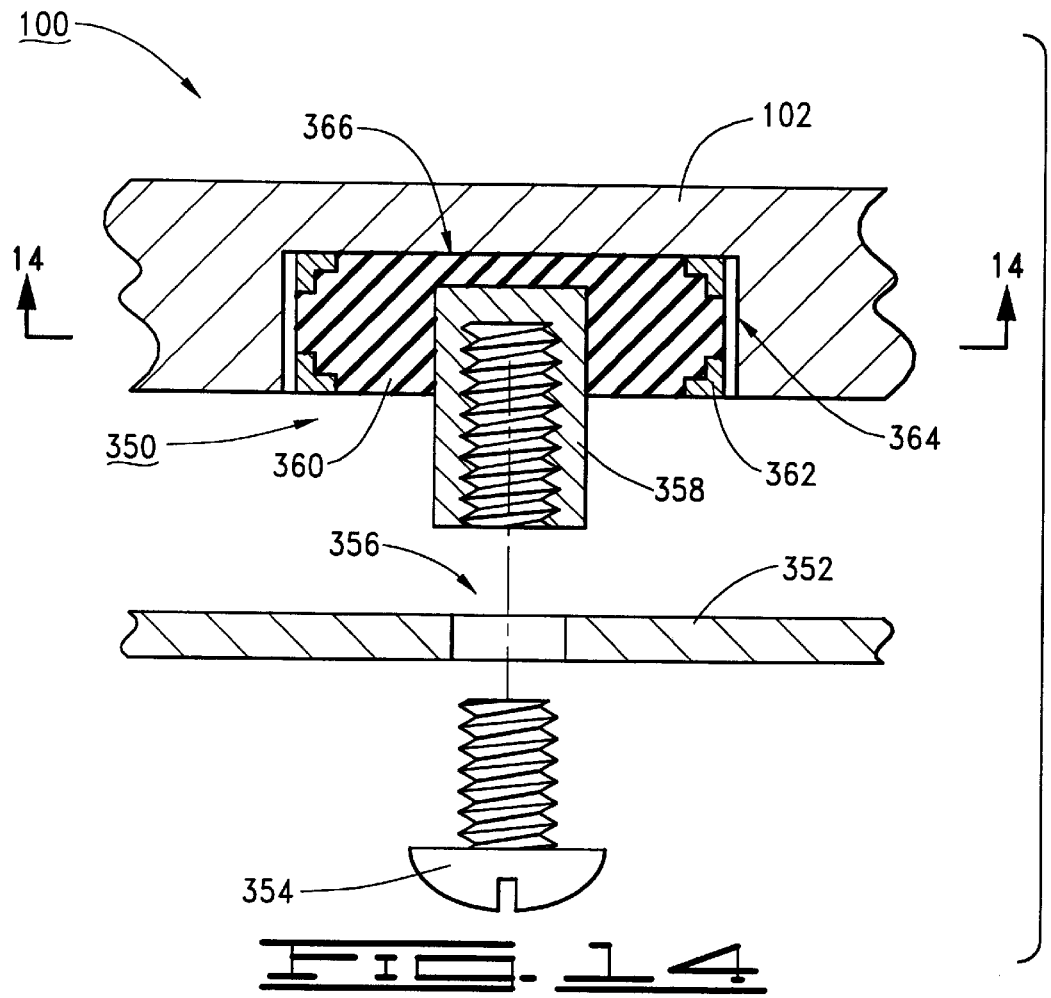
FIG. 14 shows a cross-sectional, elevational view of another alternative bottom isolation device.

Referring now to FIG. 14, shown therein is a cross-sectional, elevational view of another isolation device 350, constructed in accordance with a preferred embodiment of the present invention. As before, a portion of a rigid deck 352 of the user environment is shown to which the disc drive 100 can be mounted using a threaded fastener 354 by inserting the threaded fastener 354 through a mounting aperture 356 in the deck 352.

As before, the isolation device 350 includes a rigid threaded collar 358, a compliant elastomer 360 and a rigid stiffener 362, which generally cooperate as described above. However, the isolation device 350 presents a difference in the stiffener configuration, in that the stiffener 362 is provided with a multi-piece construction that does not completely surround the elastomer 360. This allows the elastomer to expand during vibratory inputs, thus changing both the axial and radial stiffness of the isolation device 350.

Figure 15:
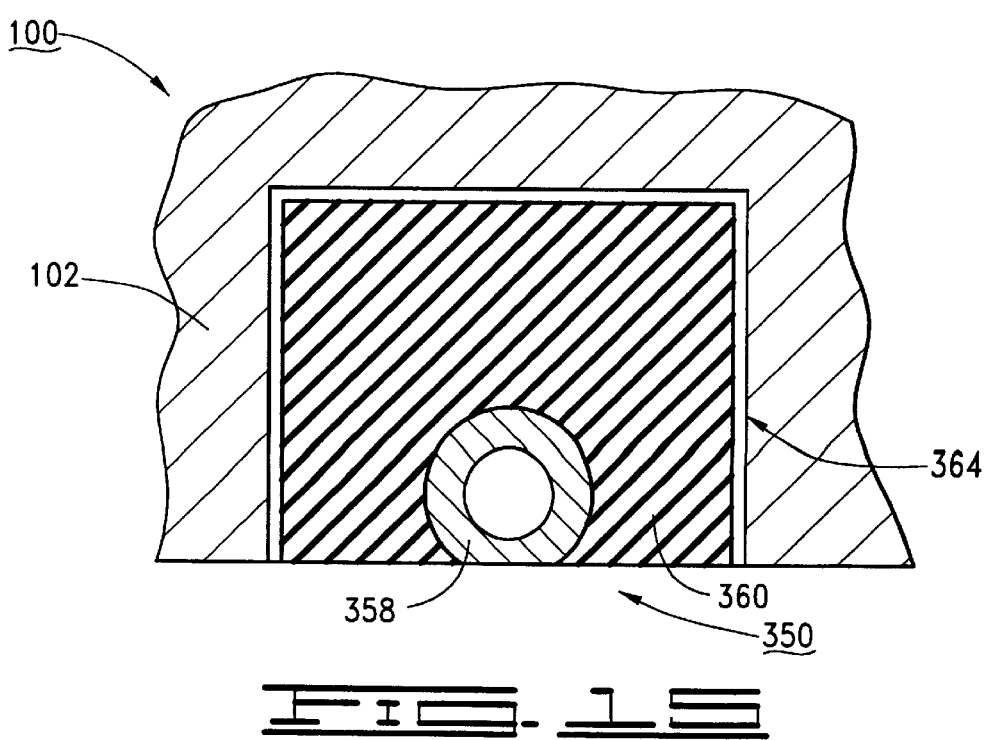
FIG. 15 provides a cross-sectional, plan view of the bottom isolation device of FIG. 14, as viewed along line 15—15 in FIG. 14.

A recess 364 is provided in the base deck 102 to accommodate the isolation device, with mounting surfaces (denoted at 366) of the elastomer 360 bonded to the base deck 102 using a suitable adhesive. As before, the isolation device is preferably configured to prevent contact between the stiffener 362 and remaining portions of the base deck 102. FIG. 15 provides a cross-sectional view of the isolation device of FIG. 14, as viewed along line 15—15 in FIG. 14.

It will be noted that although the configurations set forth by FIGS. 12–15 have been presented as alternatives to the configuration of the bottom isolation device 140 of FIGS. 2–4, features of the isolation devices 250, 350 of FIGS. 12–15 can be readily modified for incorporation into side isolation devices similar to the side isolation devices 150 of FIG. 2.

It will now be understood that the present invention, as embodied herein and claimed below, presents several advantages over the prior art. The isolation devices 140, 150, 250, 350 are each compact so that no height or width is added to the disc drive 100 thereby. Moreover, the isolation devices

140, 150, 250, 350 can be readily configured to reduce the effects of both translational and rotational vibratory inputs to the disc drive 100.

In summary, the present invention is directed to an apparatus for improving the operational performance of a disc drive by isolating the drive from externally supplied vibrations and mechanical shocks. In accordance with preferred embodiments, a disc drive 100 is provided with a base deck 102 having opposing interior and exterior 132 surfaces which contactingly support a spindle motor 106 and a printed wiring assembly, respectively.

The base deck comprises a plurality of isolation devices 140, 150, 250, 350 which receive fasteners 154, 174, 254, 354 to secure the base deck to a surface 152, 172, 252, 352 of a user environment in which the base deck is mountable. Each isolation device includes a rigid threaded collar 158, 178, 258, 358 into which a corresponding one of the fasteners is engagingly inserted. Each isolation device further includes a compliant elastomer portion 160, 180, 260, 360 which mechanically isolates the collar from remaining portions of the base deck, each elastomer portion secured within a corresponding recess 164, 184, 264, 364 of the exterior surface of the base deck. Each isolation device further includes a rigid stiffener 162, 182, 262, 362 which surrounds at least a portion of an outer surface of the elastomer portion, wherein an aperture is formed between the stiffener and remaining portions of the base deck. For purposes of the appended claims, the claimed "mounting means" will be understood to correspond to the foregoing structure.

Prior art structures discussed hereinabove such as the shock mount structures disclosed by U.S. Pat. Nos. 4,947,093 and 5,469,311, and chassis systems such as U.S. Pat. Nos. 5,140,478 and 5,777,821 are not included in the scope of the claimed "mounting means" and are moreover explicitly excluded from the definition of an equivalent structure for the claimed "mounting means."

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A disc drive, comprising:
    a spindle motor which rotates a disc about a disc axis;
    a base deck, having an interior surface and an exterior surface, the spindle motor mounted to the interior surface; and
    a plurality of isolation devices which receive fasteners to secure the base deck to a surface of a user environment in which the base deck is mountable, each of the isolation devices coupled to the exterior surface of the base deck and comprising:
        a rigid threaded collar into which a corresponding one of the fasteners is engagingly inserted;
        a compliant elastomer portion which mechanically isolates the collar from the base deck so that neither the collar or the corresponding one of the fasteners contacts the base deck, each elastomer portion secured within a corresponding recess of the exterior surface of the base deck; and
        a rigid stiffener which surrounds at least a part of an outer surface of the elastomer portion to form an aperture between the stiffener and the base deck.

2. The disc drive of claim 1, wherein the elastomer portion is bonded to the base deck using an adhesive.

3. The disc drive of claim 1, wherein the elastomer portions each have an individually selected stiffness which varies from a stiffness of at least one other elastomer portion, so that the plurality of isolation devices cooperate to reduce effects of externally generated vibratory inputs from the user environment upon the disc drive by bunching the vibratory inputs within a selected frequency range.

4. A disc drive, comprising:
    a base deck having an interior surface supporting a rotatable disc; and
    mounting means for mounting the base deck in a user environment, wherein the mounting means comprises a plurality of isolation devices which receive fasteners to secure the base deck to a surface of the user environment, each of the isolation devices comprising:
        a rigid threaded collar into which a corresponding one of the fasteners is engagingly inserted;
        a compliant elastomer portion which is disposed between the collar and the base deck to mechanically isolate the collar from the the base deck so that neither the collar or the corresponding one of the fasteners contacts the base deck, each elastomer portion secured within a corresponding recess of the exterior surface of the base deck; and
        a rigid stiffener which surrounds at least a part of an outer surface of the elastomer portion, wherein an aperture is formed between the stiffener and the base deck so that the stiffener is mechanically isolated from the base deck.

5. A method for reducing effects of externally generated vibratory inputs from a user environment to a disc drive, comprising steps of:
    (a) forming a plurality of isolation devices in a base deck of the disc drive, each isolation device comprising a rigid threaded collar, a compliant elastomeric portion disposed between the collar and the base deck so that the rigid threaded collar does not contact the base deck and a rigid stiffener which contacts and surrounds at least a portion of an outer surface of the elastomer portion; and
    (b) inserting fasteners through a surface of the user environment and into the threaded collars to secure the disc drive to the surface, wherein the isolation devices are configured so that the fasteners do not contact the base deck when inserted into the threaded collars.

6. The method of claim 5, wherein the forming step (a) comprises steps of:
    (a1) individually selecting a stiffness of each elastomer portion which varies from a stiffness of at least one other elastomer portion, so that the plurality of isolation devices cooperate to reduce the effects of the externally generated vibratory inputs from the user environment upon the disc drive by bunching the vibratory inputs within a narrow range that the disc drive can withstand.

7. The method of claim 5, wherein the forming step (a) comprises steps of:
    (a1) defining desired isolation performance criteria for the isolation devices;
    (a2) using computer modeling of external vibrations to select individual stiffnesses of the isolation devices to achieve the desired isolation performance criteria; and
    (a3) configuring each of the isolation devices in relation to the selected individual stiffnesses.

* * * * *